(No Model.)

A. H. JONES & E. H. PECK.
MIRROR PIVOT.

No. 383,468.  Patented May 29, 1888.

UNITED STATES PATENT OFFICE.

AUGUSTUS H. JONES AND EUGENE H. PECK, OF MERIDEN, CONNECTICUT.

MIRROR-PIVOT.

SPECIFICATION forming part of Letters Patent No. 383,468, dated May 29, 1888.

Application filed October 24, 1887. Serial No. 253,179. (No model.)

*To all whom it may concern:*

Be it known that we, AUGUSTUS H. JONES and EUGENE H. PECK, of Meriden, in the county of New Haven and State of Connecticut, have invented a new Improvement in Mirror-Pivots; and we do hereby declare the following, when taken in connection with accompanying drawings and the letters of reference marked thereon, to be a full, clear, and exact description of the same, and which said drawings constitute part of this specification, and represent, in—

Figure 1:
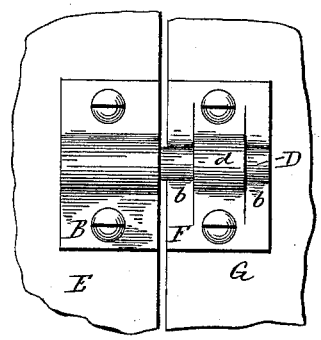
Figure 2:
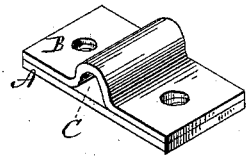
Figure 3:
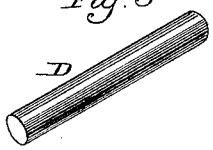
Figure 4:
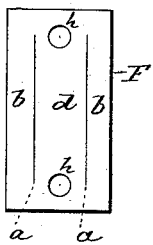
Figure 5:
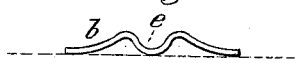
Figure 6:
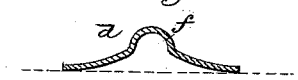

Figure 1, a rear view of a portion of a frame and post, showing the pivot applied; Fig. 2, a perspective view of the plate for carrying the spindle detached; Fig. 3, a perspective view of the spindle detached; Fig. 4, a face view of the blank as slit to form the bearing-plate; Fig. 5, an edge view of the bearing-plate, showing side bends; Fig. 6, a longitudinal central section showing intermediate bend.

This invention relates to an improvement in the device employed for hanging mirrors in bureaus, and whereby the mirror may be adjusted to various inclinations. These pivots usually consist of a spindle adapted to be attached to one part, with a corresponding socket adapted to be attached to the other part, in which the pivot will turn.

The object of this invention is a simple and cheap construction; and it consists in a plate and spindle, the plate being adapted to secure the spindle to the one part, combined with a socket consisting of a corresponding plate having a central depression made upon one side, with similar depressions from the reverse side at each side of said central depression, whereby the one depression on the one side and the two depressions on the opposite side form a socket or bearing for the spindle, all as more fully hereinafter described.

A represents a flat metal plate adapted to lie upon the surface of the frame or post, as the case may be; B, a second plate or cap in shape and size corresponding to the plate A, as seen in Fig. 2. Transversely across the plate B and upon its inner surface a U-shaped recess is formed, preferably by bending the plate. The recess C corresponds in shape to the spindle D, which is simply a piece of wire of the required size and length. The two plates A B are correspondingly drilled, as shown, for the introduction of screws or nails to secure the plates, say, to the frame E. (See Fig. 1.) The spindle D is set between the plates A B and into the recess C before the screws are set. Then the screws, being hard set, bind the spindle between the two plates, so as to firmly hold and support the spindle, and, as indicated in Fig. 1, the spindle projecting from the frame onto the post. The second plate or bearing F is best made from sheet metal, and of a size, when complete, substantially the same as plate B, as seen in Fig. 1.

To form the plate F so that it may serve as a bearing for the projecting spindle, the plate is first shaped flat, as seen in Fig. 4. Then two longitudinal slits, *a a*, are cut through the plate, and extend nearly to the ends of the plate. These slits divide the central portion of the plate into two side parts, *b b*, and an intermediate part, *d*. Transversely across the two side parts, *b b*, and in substantially the transverse central line of the plate, backward semicircular-shaped bends *e* are made, as seen in Fig. 5, and in the same line a like but reversely-curved bend, *f*, is formed across the intermediate part, *d*, as seen in Fig. 6. The combined bends of the sides *b b* and of the part *d* correspond to the projecting spindle, the bends in the respective parts being substantially one-half the circumference of the spindle. The part *d* is pierced near the bends to form screw-holes *h*, by which the plate may be secured to the frame or post, as the case may be. The downward or backward bends *e* raise the central portion of the plate, so that when set upon, say, the post G, as seen in Fig. 1, it will bear upon the post only at the ends and on the backward bends *e*, as indicated in Fig. 5, the broken lines representing the surface of the post, while the intermediate part, *d*, will bear only at the ends, leaving the central portion free from bearing, as indicated in Fig. 6, broken lines representing the surface of the post. Because of the freedom of the part *d* at its center it is adapted to be forced toward the surface upon which the plate is placed by means of the screws which secure the plate.

The plate F is applied as seen in Fig. 1— say to the post G—and the projecting end of the spindle inserted through the bends $e\ e$ and $f$. Then, to create friction upon the spindle, the screws are driven inward, their heads bearing upon the part $d$ near its bend, forcing that part $d$ toward the surface of the post, so as to bring its bend $f$ hard upon the spindle, and so as to bind the spindle between the bend $f$ and the bends $e\ e$, to produce the requisite friction on the spindle, and that friction is adjustable by the screws which secure the plate.

Preferably the plates are all made from sheet metal, but may be made from cast metal. The plate F should have a considerable degree of elasticity to permit the desired adjustment of the friction.

The bearing-plate F may be used with any of the known constructions of cylindrical pivot-spindles.

We are aware that mirror-pivot sockets have been made from sheet metal having a portion thereof adapted for adjustment upon the pivot. We therefore do not wish to be understood as broadly claiming such pivot.

We claim—

The herein-described mirror-pivot, consisting of the bearing-plate F, constructed with longitudinal slits $a\ a$, of greater length than the diameter of the pivot, and so as to form two side parts, $b\ b$, with an intermediate part, $d$, the said side parts constructed with transverse bends $e\ e$ midway of their length, and the intermediate part constructed with a corresponding bend, $f$, in line with, but in opposite direction to, the side bends, $e\ e$, the said slits extending longitudinally of the plate each side of said bends, combined with a second plate carrying a pivot, D, adapted to rest in the said bends of the plate, and the said two plates constructed for attachment, substantially as described.

AUGUSTUS H. JONES.
EUGENE H. PECK.

Witnesses:
E. A. MERRIMAN,
JOHN E. DURAND.